(12) United States Patent
Modi

(10) Patent No.: US 11,919,056 B2
(45) Date of Patent: Mar. 5, 2024

(54) ENVIRONMENTALLY FRIENDLY EXCRETA REMOVAL MATERIAL

(71) Applicant: Kapil Modi, New Delhi (IN)

(72) Inventor: Kapil Modi, New Delhi (IN)

(*) Notice: Subject to any disclaimer, the term of this patent is extended or adjusted under 35 U.S.C. 154(b) by 367 days.

(21) Appl. No.: 17/308,274

(22) Filed: May 5, 2021

(65) Prior Publication Data

US 2021/0346925 A1    Nov. 11, 2021

Related U.S. Application Data

(60) Provisional application No. 63/020,326, filed on May 5, 2020.

(51) Int. Cl.
| | |
|---|---|
| *B09B 3/21* | (2022.01) |
| *B01J 20/26* | (2006.01) |
| *B01J 20/28* | (2006.01) |

(52) U.S. Cl.
CPC .............. *B09B 3/21* (2022.01); *B01J 20/261* (2013.01); *B01J 20/2803* (2013.01); *B01J 2220/44* (2013.01); *B01J 2220/4812* (2013.01)

(58) Field of Classification Search
CPC ....... B09B 3/21; B01J 20/261; B01J 20/2803; B01J 2220/44; B01J 2220/4812
USPC ........................................................ 588/255
See application file for complete search history.

(56) References Cited

U.S. PATENT DOCUMENTS

| | | |
|---|---|---|
| 6,070,277 A | 6/2000 | Thomas |
| 8,258,366 B2 | 9/2012 | Wendelstorf |
| 2002/0139392 A1 | 10/2002 | Cervero et al. |
| 2005/0267430 A1 | 12/2005 | Maeda et al. |
| 2010/0180370 A1 | 7/2010 | Helewa |
| 2017/0233555 A1 | 8/2017 | Helewa |
| 2018/0072495 A1 | 3/2018 | Langlotz |
| 2018/0185227 A1 | 7/2018 | Pinto |
| 2018/0272395 A1 | 9/2018 | Herriott |

FOREIGN PATENT DOCUMENTS

| | | | |
|---|---|---|---|
| EP | 0811387 A1 | 12/1997 | |
| JP | H06154794 A | 6/1994 | |
| JP | 2004316045 A | 11/2004 | |
| JP | 2014226664 A | 12/2014 | |
| TR | 202008398 A2 * | 7/2020 | |
| WO | WO-2015182164 A1 * | 12/2015 | ........... A01K 1/0152 |

* cited by examiner

*Primary Examiner* — Edward M Johnson
(74) *Attorney, Agent, or Firm* — Gearhart Law, LLC

(57) ABSTRACT

A formulation is described containing organic and non-organic ingredients that readily convert human, animal and bird excreta and/or biohazard into biodegradable and/or non-biodegradable gel or granules. Formulation comprises organic and/or inorganic ingredients, absorbent, biocide, binder, fragrance additive, anthelmintic, antiprotozoal, and bacterial culture. Formulation can be deployed in various forms or modes that may be placed in receptacles.

6 Claims, No Drawings

ENVIRONMENTALLY FRIENDLY EXCRETA REMOVAL MATERIAL

CLAIM OF PRIORITY

This application claims priority to U.S. application Ser. No. 63/020,326 filed on May 5, 2020 the contents of which are herein fully incorporated by reference in its entirety.

FIELD OF THE EMBODIMENTS

The field of the embodiments of the present application relate to formulation(s) that absorb and convert human, animal, and other excreta and biohazards into a 99.99% germ free, fragrant bio-degradable and/or non-biodegradable material.

BACKGROUND OF THE EMBODIMENTS

There are a large number of human health challenges facing the world today including but not limited to hospital acquired infections (HAI), widespread contagious diseases (bacterial, viral, fungal, spores), zoonotic diseases, and infected or non-treated human, animal, and bird excreta (and/or bio hazard) contaminating the living and natural environments which promotes proliferation of germs (pathogens), helminth, and protozoa.

The embodiments of the present application aim to solve the aforementioned global health, hygiene, and environmental impact by providing a cost-effective method for hygienic disposal of human, animal, and bird excreta (and/or other biohazards).

Various systems and methods exist for handling various forms of waste. However, their formulation and method of use is substantially different from the present disclosure, as the other inventions fail to solve all the problems taught by the present disclosure.

SUMMARY OF THE EMBODIMENTS

The embodiments of the present application relate to a formulation that absorbs and converts human, animal, and bird excreta (and/or biohazards) into a fragrant and up to 99.99% germ free gel or granules which may be either bio-degradable or non-biodegradable.

In at least one embodiment, the formulation comprises organic and/or inorganic chemical ingredients including but not limited to absorbent ingredients, biocides, binding elements combined with fragrance additive, anthelmintics, and antiprotozoals that may further be combined with specially formulated safe bacterial culture that have the ability to degrade excreta or biohazards into simpler bio-degradable compounds.

In another embodiment, the process for the preparation of such a formulation includes organic and inorganic ingredients, absorbent ingredients, biocides and fragrance additive as primary components. In addition, various optional organic and inorganic ingredients include but are not limited to binders, anthelmintics, antiprotozoals, and specially formulated safe bacterial culture, and urea.

DESCRIPTION OF THE PREFERRED EMBODIMENTS

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

The embodiments of the present application describe and teach a formulation useful in hygienic disposal of various forms of excreta and/or biohazards into a fragrant and up to 99.99% germ free biodegradable and/or non-biodegradable gel or granules. The formulation may include but is not limited to absorbent ingredients, biocides, binding elements, fragrance additives, bacterial culture anthelmintics, antiprotozoals, urea and other additives providing an easy and safe way to kill or inactivate the microorganisms.

As used herein, "excreta" is defined as any waste matter discharged from the body of humans and non-human animals and includes such waste matter as urine, feces, vomit, spit, and saliva.

As used herein, "biohazard(s)" are defined as any biological or chemical substance that is dangerous to humans, animals, or the environment. Biohazard is further defined as waste from humans, animals and birds which includes items such as but not limited to blood, body tissues, body fluids (semen, cerebrospinal fluid, pleural fluid, vaginal secretions, pericardial fluid, amniotic fluid, saliva, peritoneal fluid), body parts, microbiological wastes (specimen cultures, disposable culture dishes, discarded viruses, and devices used to transfer or mix cultures), pathological waste (unfixed human tissue (excluding skin), waste biopsy materials, and anatomical parts from medical procedures or autopsies).

As used herein, "germ" or "pathogen" is defined as an infectious microorganism or agent that causes disease. Germs can be transmitted a few ways depending on the type. They can be spread through skin contact, bodily fluids, airborne particles, contact with feces, and touching a surface touched by an infected person. There are different types of germs such as viruses, bacteria, fungi and spores.

As used herein, "living environment" is defined as any building or space, frequented or lived in by humans, animals and birds.

As used herein, "natural environment" is defined as nature and water bodies. This environment encompasses the interaction of all living species, climate, weather and natural resources that affect human survival and economic activity.

As used herein, "bacterial culture" is defined as engineered aerobic and non-anaerobic bacteria that have the ability to break down/degrade excreta/biohazards into simple biodegradable compounds.

As used herein, "surface" is defined as a porous or non-porous surface such as but not limited to carpet, fabric, floors, grass, soil from where excreta, biohazard, or any waste material is to be removed.

Preferably, in at least one embodiment of the formulation disclosed herein, the formulation comprises absorbent ingredients 60-98%, biocides 0.01%-15%, fragrance additives 0.5%-2.5%, binder 0-30%, anthelmintic 0-3%, antiprotozoal 0-4%, urea 0-10% and/or specially formulated safe aerobic/anaerobic bacterial culture 0%-10% which have the ability to degrade human or animal excreta into simpler bio degradable compounds.

In one embodiment, the absorbent ingredient contained in the embodiments of the present invention is selected from but not limited to inorganic absorbent ingredients such as, sodium and potassium polyacrylates while organic absorbent ingredients such as bamboo fiber, wood pulp, air laid wood pulp, absorbent non-woven paper/fabric (made of wood pulp, fiber).

In one embodiment, the biocide contained in the embodiments of the present invention is selected from but not limited to quaternary compounds, phenolic compounds, chlorhexidine compounds, chlorine-releasing agents.

Examples of quaternary compounds include benzalkoniumchloride, dimethyl benzyl ammonium saccharinate, dimethylethylbenzyl ammonium chloride, didecyl dimethyl ammonium chloride. Few examples of phenolic compounds are O-benzyl-p-chlorophenol, chlorophenol, chloroxylenol, O-phenylphenol. Few examples of chlorhexidine compounds are chlorhexidinediacetate(CHA), chlorhexidinedihydrochloride, chlorhexidinedigluconate, chlorhexidinegluconate, chlorhexidinephosphanilate. Few examples of chlorine-releasing agents are sodium hypochlorite, glutardehyde, ortho-phthalaldehyde, peraceticacid, hydrogen peroxide/hydrogen peroxide silver, chlorine dioxide, potassium peroxymonosulfate, sodium chlorideandorganic biocideasneem.

Various embodiments of the formulations using the abovementioned biocides have been tested and have shown confirmed "-cidal, -cide, -static" activity on over 150 types of germs, bacteria, viruses, fungi, allergens, and yeasts as outlined below:

Bacteria can be but are not limited to *Mycobacterium tuberculosis, Mycobacterium bovis, Salmonella choleraesuis, Staphylococcusaureus, Pseudomonas aeruginosa, Pseudomonas cepacia, Pseudomonas maltophilia, Salmonellaarizonae, Salmonella enteritidis, Salmonella gallinarum, Salmonella pullorum, Salmonella sonnei, Salmonella paratyphi, Salmonella schottmuelleri, Salmonella typhi (Salmonella typhosa), Salmonella typhimurium, Shigelladysenteriae, Shigellaflexneri, Staphylococcus epidermis, Staphylococcus hyicus, Enterobacteraerogenes, Enterococcus* sp., *Enterococci* group D sp., *Enterococcus faecalis, Enterobacterchloacae, Escherichia coli, Proteus vulgaris, Proteusmirabilis, Klebsiellapneumoniae, Neisseria catarrhalis, Neiserriaelongata, Serratiamarcescens, Streptococcuspyogenes, Streptococcus salivarius, Streptococcus hemolyticus, Streptococcus equi, Streptococcus suis, Taylorellaequigenitalis, Diplococcuspneumoniae, Corynebacteriumdiptheriae, Providenciarettgeri, Alcaligenesfaecalis, Bordetellabronchiseptica, Mycoplasmasynoviae, Mycoplasma gallisepticum, Pasteurellaanatipestifer, Pasturellamultocida, Rhodococcusequi, Brevibacteriumammoniagenes,* odor-causing bacteria, slime-forming bacteria, ammonia-producing bacteria, *Clostridium difficile (C Difficile), Vibrio cholerae, Campylobacter jejuni, Listeria monocytogenes, Salmonella entericaAlcaligenes* sp., *Diplococcuspneumoniae* Type 1, *Lactobacillus delbrueckli* subspecies *lactis, Pasteurellamultocida, Shigellasonnei, Pseudomonas fluorescens* (biotype B), *Pseudomonas solanacearum, Pseudomonas cichorii, Erwiniacaratovora, Erwiniachrysantemi, Agrobacterium tumifaciens, Xanthomonascampestria, Aeromonashydrophila, Bordetellaavium, Corynebacteriumsepedonicum, Klebsiellapneumoniae, Salmonella enteritidis,* Anitbiotic Resistant Bacteria: *Staphylococcusaureus* (MRSA), *Klebsiellapneumoniae*-NDM-1 positive, *Klebsiella pneumonias* Carbapenem Resistant, *Escherichia coli* with extended beta-lactamase resistance (ESBL), Multi-Drug Resistant (MDR) *Acinetobacterbaumannii,* Multi-Drug Resistant (MDR) *Enterobacteraerogenes, Klebsiellapneumoniae* with extended beta-lactamase resistance (ESBL), Penicillin Resistance *Streptococcus pneumoniae* (PRSP), *Klebsiellapneumoniae*-NDM-1 positive.

Fungi can be but are not limited to *Tricodermaviride, Trichophytoninterdigitales, Trichophytonmentagrophytes, Trichophytonequinarum, Candida albicans, Microsporumcanis, Microsporumgypseum, Aspergillusniger, Aspergillusfumigatus, Pennicilliumglaucum, Verticilliumfungicola, Mycogoneperniciosa, Dactyliumdendroides, Botrytis cinerea, Phytophthoracinnamoni, Phthiumultimum, Rhizoctoniasolani, Verticilliumalboatrum.*

Viruses can be but are not limited to Human Immunodeficiency Virus Type 1, Hepatitis B Virus, Hepatitis C Virus, H1N1 Influenza A Virus, Human Coronavirus SARS, Rhinovirus Type 39 (common cold), Rotavirus WA (infectious diarrhea), Norovirus, Duck Hepatitis B Virus (DHBV), Polio I virus, Rhinovirus, Feline Picornavirus, Avian Reovirus, Mouse Hepatitis virus, Vaccinia virus, Herpes simplex Type 1, Herpes simplex Type 2, Pseudorabies, avian infectious bronchitis, Avian Adenovirus, avian influenza, Avian Rotavirus, porcine transmissible gastroenteritis, Porcine Rotovirus, Influenza Type A/Mich, Influenza A/England, Influenza A (Japan, Asian, Hong Kong), Newcastle disease, mumps virus), Human Rhinovirus Type, Feline Leukemia virus, Rubella, equine arteritis, Avian Laryngotracheitis virus, Parainfluenza virus, Adenovirus Type 2, Canine Parvovirus, duck enteritis, Equine Herpes virus, Equine Rotavirus, Feline Calicivirus, Feline Rhinotracheitis. Avian influenza Virus, Avian Bronchitis Virus, Avian Laryngotracheitis Virus, Avian Herpes Virus 2, Hog Cholera Virus, Pseudorabies Virus, Influenza A, Herpes Simplex, Adenovirus Type 2 & 4, Vaccinia Virus, Adenovirus Type 5, Herpes Simplex Type 2, Herpes simplex WI-38, Ebola Virus.

Yeasts can be but are not limited to *Candida albicans, Saccharomyces cerevisiae.*

Helminths are also known as parasitic worms which involves but are not limited to the three major assemblages of parasitic helminths such as Nemathelminthes (nematodes), Platyhelminthes (flatworms) including its subdivisions Cestoda (tapeworms) and Trematoda (flukes).

Protozoal pathogens include but are not limited to Entamoebahistolytica, Giardialambia, Balantidium coli, Cryptosporidium parvum, Cyclosporacayetanensis, Campylobacter, non-typhoidal Salmonella (NTS), Lassa virus, Cryptosporidium, Toxoplasma gondii.

In one embodiment, fragrance additives contained in the embodiments of the present are selected from but not limited to natural fragrance additives (organic, chemical free) such as orange, pomegranate, rosemary melon, watermelon, citrus, lemon, kiwi, lavender, cinnamon, dragon fruit. Furthermore, inorganic fragrance additives (chemical/industrial fragrances) include, apple, passion fruit, rose, citrus, orange, mango, wild berries, raspberry, peach, strawberry, waterlilly, watermelon, citrus, and mogra.

In one embodiment, the binder additive contained in the embodiments of the present invention may include but not limited to modified starch and aerosol.

In one embodiment the anthelmintic contained in the embodiments of the present invention is selected from but not limited to albendazole, fenbendazole, levamisole, oxyclozanide, tetramisole, iveremectin, praziquantel, urea CO(NH2)2, peracetic acid.

In one embodiment, the bacterial culture contained in the embodiments of the present invention is selected from specially formulated safe aerobic or anaerobic bacteria which have the ability to degrade human or animal excreta and biohazard into simpler biodegradable compounds.

In a preferred embodiment, there are various examples of formulations contained in the present invention comprising sodium super absorbent polyacrylate in the range of 60%-80% followed by addition of binder in the range of 0.1%-40% with adding fragrance additive 0.05% to 1%. Furthermore, biocide in the range of 0.01% to 15% and anthelmintic in the range of 0.05% to 1.5% added to the formulation which may further combined with an additive to raise the pH level of the formulation which may include urea by weight in the range of 0.001 to 30%. Further trials were performed on potassium super absorbent polyacrylate in the range of 60%-80% followed by addition of binder in the range of 20%-40% with adding fragrance additive 0.05% to 1%. Furthermore, Biocide in the range of 0.01% to 15% and anthelmintic in the range of peracetic acid 4% added to the formulation.

The formulations optionally comprise organic absorbent ingredient in the range of 70-90% with organic fragrance additive in the range of 0.05% to 1% followed by addition of organic biocide in the range of 0.01% to 15%.

A formulation used for converting human and animal excreta and biohazards wherein proportion of the organic and inorganic ingredients can be altered depending on the prevailing environment of the country, nature and type of excreta.

The process for preparation of formulation includes absorbent material and biocides as primary components to which optionally added are organic or inorganic ingredients not limited to binder, fragrance additive, antiprotozoal and/ or specially formulated safe bacterial culture either by way of simple adding or spraying and mixing. In this process it is taken care that all primary components are properly mixed with additional ingredients.

In another preferred embodiment, the present invention includes a process for conversion of excreta into a gel or granules, to achieve the aforementioned formulation is uniformly sprinkled to cover the entire surface area of the excreta at the rate of 1 gm to 2.5 gm of formulation per 50 ml/gm of excreta. The formulation absorbs and converts the excreta into a gel or granules within 60 seconds. The time may increase depending upon the nature of excreta. After the conversion of the excreta into gel or granules, remove the gel or granules from the surface by using a broom and dusting pan and dispose as per local bio waste management laws. Here, the amount of formulation used for the conversion of excreta into a gel or granules specifically varies depending upon the nature of the excreta.

The formulation may be deployed in various forms such as but not limited to powder, granules, sachets, water soluble sachets, discs, tablets, dissolvable paper which may be placed in various receptacles such as but not limited to paper, plastic, bio degradable or non-biodegradable, steel, composite materials; bags, glass, cups, paper, bed pans, portable/fixed toilets, bottles.

EXAMPLES OF INVENTION

Formulations of the present invention are described in more detail with reference to the following examples. These examples are provided by way of illustration only and should not be construed as to limit the scope or spirit of the appended claims in any manner.

| Components* | Example 1 | Example 2 | Example 3 |
|---|---|---|---|
| Absorbent | 75%-90% | 90-99% | 96% |
| Biocide | 0.01%-7% | 0.8%-3% | 0.8%-1% |
| Binder | 20%-30% | 0% | 1% |
| Fragrance additive | 0.1%-2% | 0.5%-5% | 1-3% |
| Antihelminthic/Anti Protozoal ** | 0.5%-2% | Nil | Nil |
| Specially Formulated Bacterial culture | 1% to 10% | Nil | Nil |

*Here, components are in the weight percentage range.
** A urea as an additive may further be combined or replace the anthelmintic by weight of 0.1%-30% to raise the pH level of the formulation in order to deactivate the helminths and other parasites.

Formulations of the present invention as described herein are suitable for making or using in the industry.

A formulation used for converting human, animal or bird excreta and bio hazards wherein proportion of the organic and inorganic ingredients can be altered depending on; the prevailing environment of the country, nature and type of excreta.

Exemplary methods of use of few formulations of present invention are as mentioned below.

Method 1: for Disposal of Feces Including Solid, Semi Solid Biohazards from All Types of Surfaces Step 1: sprinkle 1 to 2.5 grams of the formulation per 50 grams of feces to deodorize and disinfect the feces.

Step 2: remove the feces from the surface using commonly used methods for disposing it such as scooping it with a bag, broom and dusting pan or poop picker.

Step 3: pour or spray 20-100 ml water onto the soiled surface and scrub it using any cleaning apparatus such as a broom or scrub to remove the feces residue (if any) from the surface.

Step 4: sprinkle 1 to 2.5 grams of the formulation on the surface to cover the entire surface area of the spill (water) and wait for up to 60 seconds for the formulation to absorb the water and residue on the surface. The precise duration of time may increase based on the quantity and nature of feces and the quantity of formulation sprinkled onto the spill.

Step 5: remove the gel from the surface by using a method such as a broom/dusting pan, cleaning with a cloth or a vacuum cleaner which can vacuum liquid & solids.

Step 6: dispose as per local bio waste management laws.

Step 7: repeat step 2 to 6 if necessary.

Method 2: for Conversion of Liquid Excreta into a Gel from All Surfaces

Step 1: sprinkle the formulation evenly to cover the entire surface area of the liquid excreta at the rate of 1-2.5 gram of formulation per 50 ml of liquid excreta.

Step 2: wait for up to 60* seconds for the powdered formulation to absorb and convert the liquid excreta into a gel. However, the precise duration of time taken to absorb and convert the liquid excreta may increase based on its nature/consistency.

Step 3: remove the gel from the surface by using a method such as a broom/dusting pan, wiping with a cloth or a vacuum cleaner which can vacuum liquid & solids.

Step 4: dispose as per local bio waste management laws.

Step 5: repeat step 1 to 4 to remove any residual liquid excreta from the surface.

Laboratory test of examples of Table 1 is carried out for its antimicrobial activity. Powder form of present invention randomly selected for testing comprises absorbent, fragrance additive and biocides in which biocide comprises Alkyl Dimethyl Benzyl Ammonium Chloride and Alkyl Dimethyl Ethyl Benzyl Ammonium Chloride. The product evaluated for its antimicrobial activity in laboratory on pathogenic bacteria, fungi and sporocides which are major microorganism responsible for diseases to human or animal. which Table 2 shows bactericidal, fungicidal, and sporicidal activities of product.

Escherichia coli (E. coli) is Gram-negative straight rod bacteria, facultatively anaerobic chemoorganotroph capable of both respiratory and fermentative metabolism. Pathogenic E. coli strains are responsible for infection of the enteric, urinary, pulmonary and nervous systems. E. coli strains shows the core genome to be about 2000 genes while the pan-genome has over 18,000 genes. There are multiple, striking integration hotspots that are conserved across the genomes, corresponding to regions of abundant and parallel insertions and deletions of genetic material. Strain ATCC 8739 is a fecal strain. It is used to test the efficiency of antimicrobial agents. To test excreta in the present invention ATCC 8739 of E. Coli is selected. Staphylococcus aureus sub species aureus strain ATCC 6538 is a standard testing strain for disinfectants was initially isolated from a human lesion prior to the introduction of the widespread use of antimicrobials. This strain is selected for testing because it is important not only for routine screening in antimicrobial susceptibility testing but also for studying the evolution of resistance to biocides.

Bacillus subtilis (B. subtilis) is a gram-positive, aerobic, spore-forming soil bacterium ubiquitous in the environment. In the literature, only a few cases of infections due to B. subtilis are reported and only one retrospective study describes the isolation of antibiotic-resistant strains of B. subtilis.

Fungal genus Candida causes a disease invasive candidiasis. It is a serious infection that can affect the blood, heart, brain, eyes, bones, and other tissues (Antinori et al., 2016). Moreover, it is the most common fungal disease among hospitalized, oncologic and immune suppressed patients in the developed world (Antinori et al., 2016). Mucosal infections are also very common, with vulvovaginal candidiasis (VVC) being the second most frequent gynecological condition after bacterial vaginosis (Anderson et al., 2004). VVC is a disease that significantly impacts the quality of life of affected women worldwide, particularly those with chronic and recurrent infections (Sobel, 2016). Out of many Candida multidrug-resistant Candida albicans has been selected for testing the product of present invention.

Testing is done using Dey-Engley neutralizing broth to neutralise the residual action of the disinfectants on the microbiological growth. Dey-Engley Neutralizing Broth is used in disinfectant testing where neutralization of the antiseptics and disinfectants is important for determining bactericidal activity. Bactericidal activity is measured by percentage log reduction of bacterial count.

Test Condition:
Amount of powder tested: 5 gm
Biocides in the Composition: Alkyl Dimethyl Benzyl Ammonium Chloride 0.250% and Alkyl
Dimethyl Ethyl Benzyl Ammonium Chloride 0.250%
Contact time: 60 seconds 2, 5 and 10 Minutes
Incubation temperature: 34° C., 25° C.
Neutralizer used: Dey engley neutralizing broth Bactericidal, Fungicidal, and Sporocidal activity is shown in below table by along with initial count and % of age reduction at time interval of 1, 2, 5 and 10 minutes

TABLE 2

| Organism Used | Initial count Cfu/ml | After 60 seconds | After 2 minutes | After 5 minutes | After 10 minutes |
|---|---|---|---|---|---|
| Escherichia Coli (ATCC 8739) | 82000000 | 62.19 | 87.80 | 99.02 | 99.97 |
| Staphylococcus aureus (ATCC 6538) | 74000000 | 70.27 | 93.24 | 98.78 | 99.95 |
| B. Subtilis (ATCC 6633) | 65000000 | 56.92 | 89.23 | 95.38 | 99.96 |
| Candida albicans (ATCC 10231) | 5400000 | 59.25 | 83.33 | 97.77 | 99.90 |

The above result shows that after 60 seconds more than 55-70% any type of germs killed and in 2-10 minutes about 99.97% are killed. This proves that product of present provides containment of germs (pathogens and source) and thereby stopping the transmission or spreading of germs from any type of excreta of human and animal.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A formulation for converting human excreta, animal excreta, and biohazards into biodegradable or non-biodegradable up to 99.99% germ free, fragrant gel or granules for easy hygienic disposal, the formulation comprising:
   about 60% to about 98% of an absorbent;
   about 0.01% to about 15% of biocides;
   about 0.5% to about 2.5% of a fragrance;
   up to about 30% of a binder;
   up to about 10% of an anthelmintic, an antiprotozoal, a specially formulated safe bacterial culture, or combination thereof;
   wherein the human excreta, the animal excreta, and the biohazards are selected from the group of: waste from humans, animals and birds, any biological or chemical substance that is dangerous to humans, animals, or the environment, or a combination thereof.

2. The formulation of claim 1, wherein formulation is powder.

3. The formulation of claim 2, wherein the formulation is deployed in granules, sachets, discs, tablets, and dissolvable paper.

4. The formulation of claim 1, wherein the biodegradability or non-biodegradability of the formulation depends upon the composition and nature of ingredients.

5. The formulation of claim 1, wherein binder is selected from the group consisting of: modified starch and aerosol.

6. The formulation of claim 1, wherein the anthelmintic is selected from the group consisting of: albendazole, fenbendazole, levamisole, oxyclozanide, tetramisole, iveremectin, praziquantel, urea, and peracetic acid.

* * * * *